United States Patent [19]

Putch

[11] 4,232,889
[45] Nov. 11, 1980

[54] RECOCKABLE WELL HANGER

[75] Inventor: Samuel W. Putch, Houston, Tex.

[73] Assignee: Norman A. Nelson, Houston, Tex.; a part interest

[21] Appl. No.: 913,151

[22] Filed: Jun. 6, 1978

[30] Foreign Application Priority Data

Jun. 16, 1977 [GB] United Kingdom .............. 25322/77

[51] Int. Cl.³ ............................................ F16L 35/00
[52] U.S. Cl. ..................................... 285/141; 285/18;
285/143; 285/307; 285/321; 166/217
[58] Field of Search ....................... 166/217, 208, 209;
285/140–143, 321, 322, 307, 315, 330, DIG. 22,
18, 304, DIG. 21

[56] References Cited

U.S. PATENT DOCUMENTS

| | | | |
|---|---|---|---|
| 2,356,208 | 8/1944 | Bridwell | 285/322 X |
| 3,071,193 | 1/1963 | Raulins | 285/321 X |
| 3,285,283 | 11/1966 | Calvin | 285/321 X |
| 3,507,329 | 4/1970 | Stone | 166/217 X |
| 3,741,589 | 6/1973 | Herd et al. | 285/3 |
| 3,918,747 | 11/1975 | Putch | 166/217 X |

FOREIGN PATENT DOCUMENTS 924708  5/1963  United Kingdom ..................... 166/217

Primary Examiner—Roy D. Frazier
Assistant Examiner—Carl F. Pietruszka

[57] ABSTRACT

A well pipe hanger assembly for suspending an inner pipe from an outer pipe. A hanger body with an annular recess in its outer peripheral surface in which a resiliently expandable and contractible locking ring is positioned in the recess between two stop shoulders for engagement with a matching profile on the inner peripheral surface of the outer pipe. The locking ring includes first and second telescoping portions with a re-engageable releasing means between the first and second portions, initially holding the portions together but allowing longitudinal disengagement and re-engagement of the telescoping portions. Preferably, the re-engagable releasing means includes beveled cam surfaces on each portion thereby providing a recockable expanding hanger which automatically allows re-cocking of the locking means upon upward movement of the hanger body.

1 Claim, 2 Drawing Figures

RECOCKABLE WELL HANGER

BACKGROUND OF THE INVENTION

It is generally old, as shown in my U.S. Pat. No. 3,918,747, to support an inner casing in a well from an outer casing by means of a hanger having a resiliently expandable and contractible locking ring. The present invention is directed to an improved well hanger and constitutes an improvement over the embodiment illustrated in FIGS. 8-A and 8-B of the above-named patent by providing a recockable expanding locking ring which uses no shear pins or release rings and allows automatic recocking of the locking ring upon an upward movement of the hanger. The telescoping portions of the locking ring will be initially held together in the proper relationship to mate with and coact with a mating profile in the outer pipe and prevent premature setting of the locking ring after which time the telescoping sections of the locking ring are longitudinally released. However, the locking ring may be recocked to its original position by an upward pull on the hanger and thereafter reset without removal from the well and/or recocked for removal from the well while being maintained in the collapsed position.

SUMMARY

The present invention is directed to a well hanger for suspending an inner pipe from an outer pipe, such as casings and tubings, which includes a resiliently expandable and contractible locking ring radially movable on a hanger body for engagement with the outer pipe in which the locking ring is a telescoping spring ring having first and second telescoping portions with a detent therebetween which initially holds the first and second portions of the locking ring together for performing the functions of remaining in a collapsed position and avoid engaging extraneous shoulders in the well, and mating with the proper profile in the inner periphery of the outer pipe. The re-engageable releasing means or detent is disengaged upon setting of the hanger to allow the upper portion of the locking ring to be fully locked into place, but upon upward movement of the hanger body the first and second portions of the locking ring may be re-engaged for resetting or removal from the well.

Still a further object of the present invention is the provision of a recockable locking ring which avoids the use of shear pins or release rings in which the re-engageable releasing means between the first and second telescoping portions include beveled cam surfaces on each portion.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

Figure 1:
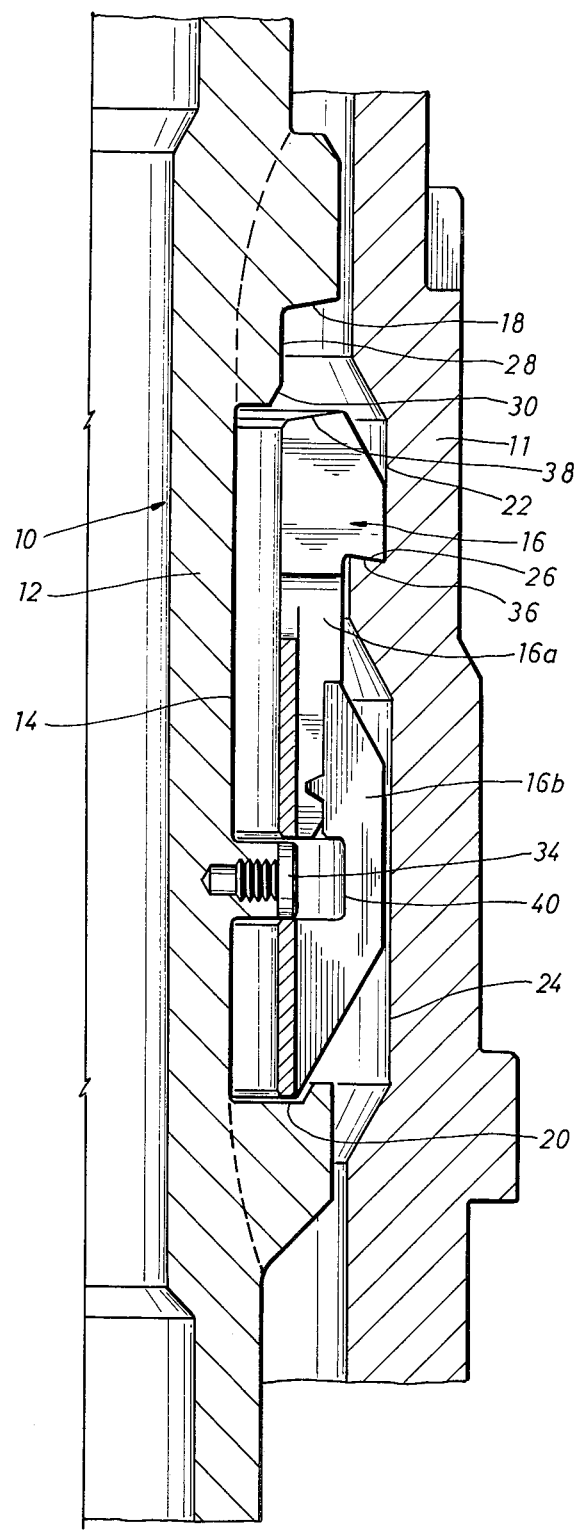
FIG. 1 is an elevational view, in half section, of the recockable expanding well hanger of the present invention shown in a landing position in a casing.

Referring now to the drawings, the reference numeral 10 generally indicates the hanger of the present invention and generally includes a hanger body 12 having an annular recess 14 for receiving a resiliently expandable and contractible locking ring, generally indicated by the reference numeral 16 between an upper stop shoulder 18 and a lower stop shoulder 20 at each end of the recess 14. The recess 14 carries the locking ring 16 and allows it to contract inwardly into the recess 14 as the hanger 10 is moved downhole through a casing 11. The casing 11 includes a profile consisting of a locking notch 22 and a locating notch 24 for coacting with the locking ring 16. The locking notch 22 includes a support shoulder 26 at its lower end. The recess 14 includes a backup or locking surface 28 with a tapered surface 30 therebelow for forcing the locking ring 16 outwardly. A holding shoulder 34 is provided in the recess 14 for coacting with the locking ring 16 for maintaining the ring 16 in the desired vertical position prior to setting.

The locking ring 16 is circular with a split to form a "C" ring and is resilient so as to spring outwardly when allowed. The locking ring 16 has distinctly separate but mating and coacting portions including the upper portion 16a and a lower portion 16b. The upper portion 16a is the weight support and locking portion and its outer periphery is shaped to coact with the locking notch 22 and includes a tapered surface 36 which coacts with the shoulder 26. The locking portion 16a also includes a tapered shoulder 38 for coacting with the surfaces 30 and 18 for forcing the locking portion 16a outwardly into notch 22 and supporting the hanger body 12. The lower portion 16b has a contour and profile to coact with the profile of the locating notch 24 for preventing the hanger from becoming set until the proper location in the casing 11 is reached. The lower portion 16b also includes a recess 40 which receives the holding shoulder 34 for holding the locking ring 16 in the proper position and preventing premature setting of the ring 16 until the proper location in the casing 11 is reached.

Figure 2:
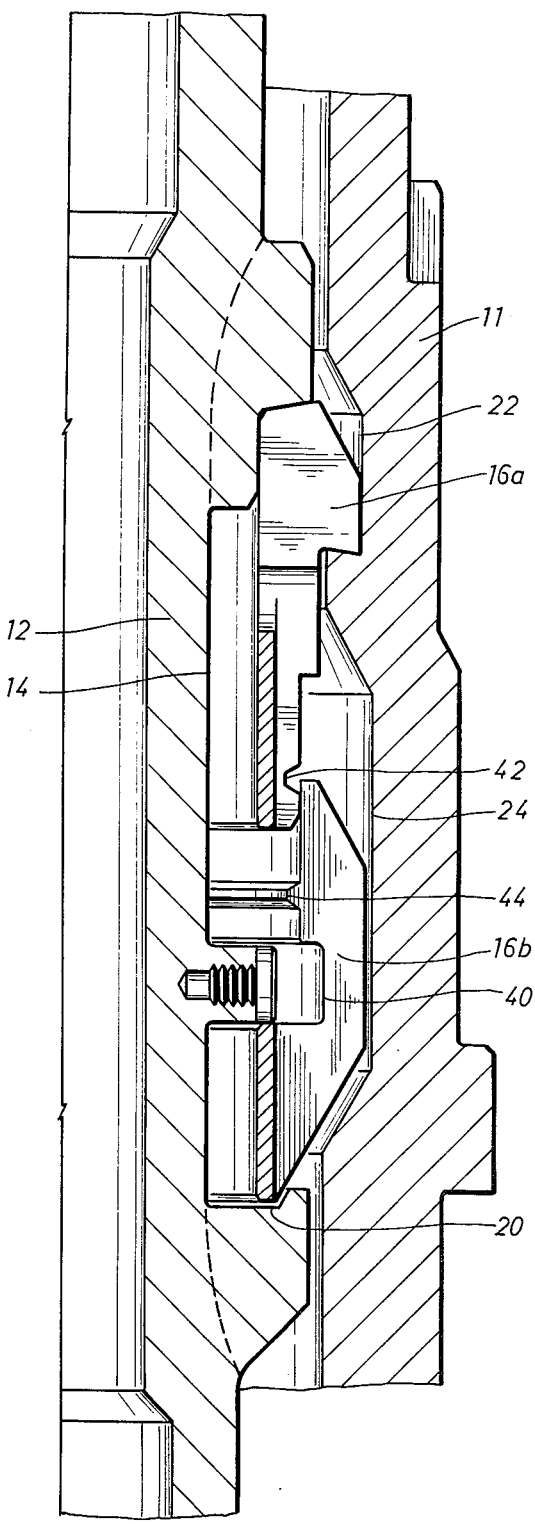
FIG. 2 is a view similar to FIG. 1 in which the hanger is in its outer biased position and in locked position in the outer casing hanger.

Re-engageable releasing means are provided between the first 16a and second 16b portions of the locking ring 16 for initially holding the portions 16a and 16b longitudinally together but allowing longitudinal disengagement and re-engagement. Such means may include beveled cam surfaces on each portion such as a groove 42 adjacent the lower end of the first portion 16a and a coacting boss 44 on the lower portion 16b. While the hanger 10 is being run through the casing 11, the spring 16 is in the collapsed position in the recess 14 with the re-engageable releasing means 42 and 44 engaged whereby the lower portion 16b holds the upper portion 16a in the collapsed position even in the event that the upper portion 16a may encounter a recess in the casing 11. The locking ring 16 is held collapsed until it reaches coacting locking notch 22 and locating notch 24, as best seen in FIG. 1, wherein the locking ring 16 may expand into the casing 11 profile. Since the lower portion 16b is secured from longitudinal movement by the holding shoulder 34 engaging recess 40, the re-engageable releasing means 42 and 44 are still engaged, the first portion 16a of the locking ring 16 is held in the proper position. Referring now to FIG. 2, as the hanger body 12 is moved further downwardly, the holding shoulder 34 carries the lower portion 16b downwardly releasing the re-engageable locking means 42 and 44. In the final locked position, shown in FIG. 2, the boss 44 is moved downwardly past the lower end of the upper portion 16a thereby allowing the upper portion 16a to be locked in position.

When it is desired to remove the hanger 10 from within the casing 11, the procedure just described is reversed beginning with an upward pull of the hanger body 10. The lower stop 20 exerts an upward pull on the lower portion 16b of the hanger ring 16 and moves the lower portion 16b upwardly until the ring 16 is re-engaged. As a result, the locking ring 16 is recocked and may be set again even without removal of the hanger 10 from the well and in addition the lower recocked portion 16b tends to assist in retaining the upper portion 16a in a collapsed position.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A pipe hanger assembly for vertically suspending an inner pipe from an outer pipe having a substantially constant diameter above a locking notch and a locating notch which pipe hanger assembly comprises:

(a) an elongated tubular hanger body for passing through said outer pipe connected to said inner pipe, defining an annular recess in its outer peripheral surface, having a stop shoulder at the upper end and at the lower end of said annular recess, having a locking surface in the upper portion of said annular recess, and having a holding shoulder located intermediate to the ends of said annular recess;

(b) a resiliently expandable and contractable cylindrical upper locking ring slideably positioned about said hanger body in the hanger body annular recess, said upper locking ring having a tapered shoulder at the top thereof for contacting said stop shoulder at the upper end of said hanger body annular recess, having a support surface for engaging said outer pipe locking notch, and having a chamfered outer top edge for disengaging from said locking notch and having an upper inner periphery for engaging said hanger body locking surface;

(c) a resiliently expandable and contractable cylindrical lower locking ring having a recess in its internal peripheral surface, and having chamfered top and bottom ends for engaging and disengaging said outer pipe locating notch, wherein said lower locking ring is mounted about said hanger body within said annular recess such that said hanger body holding shoulder engages said lower ring recess allowing lower locking ring transverse movement but not longitudinal movement and such that the upper portion of said lower ring is telescopically mounted about the lower portion of said upper ring; and (d) detent means comprising a chamfered male flange transversely arrayed within the upper inner periphery of said lower ring and a chamfered female groove, for receiving said chamfered male flange, transversely arrayed about the lower outer periphery of said upper locking ring, for maintaining said upper locking ring and said lower locking ring compressed and in telescoped relationship while passing said pipe hanger assembly upwardly or downwardly within said outer pipe above said locking and locating notches, and for maintaining said upper locking ring and said lower locking ring expanded and in disengaged relationship upon said lower locking ring encountering said locating notch.

* * * * *